Feb. 1, 1966 A. ALFORD 3,233,194

SINGLE SIDEBOARD SUPPRESSED CARRIER MODULATORS

Filed March 8, 1962

INVENTOR.
ANDREW ALFORD
BY
Ezekiel Wolf, Wolf Greenfield
ATTORNEYS

United States Patent Office 3,233,194
Patented Feb. 1, 1966

3,233,194

SINGLE SIDEBOARD SUPPRESSED CARRIER MODULATORS

Andrew Alford, Winchester, Mass.
(299 Atlantic Ave., Boston, Mass.)

Filed Mar. 8, 1962, Ser. No. 178,307
8 Claims. (Cl. 332—45)

The present invention relates in general to modulation and more particularly concerns a novel system for providing single sideband suppressed carrier modulation wherein upper and lower sideband signals are separately provided with relatively simple reliably operating apparatus.

It is an important object of the invention to provide single sideband suppressed carrier modulation.

It is another object of the invention to achieve the preceding object with apparatus which functions reliably and requires little or no adjustment in the field.

It is still another object of the invention to achieve the preceding objects with apparatus capable of operating over a wide frequency range, including the microwave range.

According to the invention, first and second balanced modulators balance modulate a common carrier frequency signal with a common modulating frequency signal to provide first and second balanced modulated signals. These signals are applied to respective side branches of a hybrid. The effective electrical length of the path between the carrier signal source and one of the side branches differs from the pathlength between the carrier frequency signal source and the other side branch by substantially an odd multiple of electrical quarter wavelengths at the modulating frequency.

Figure 1:
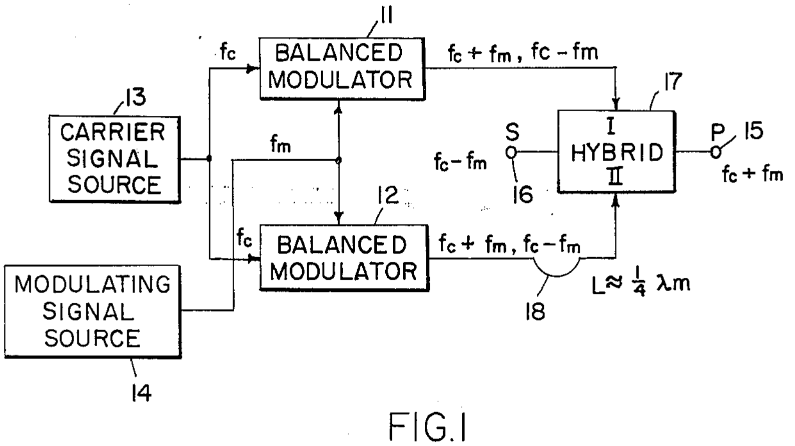
Figure 2:
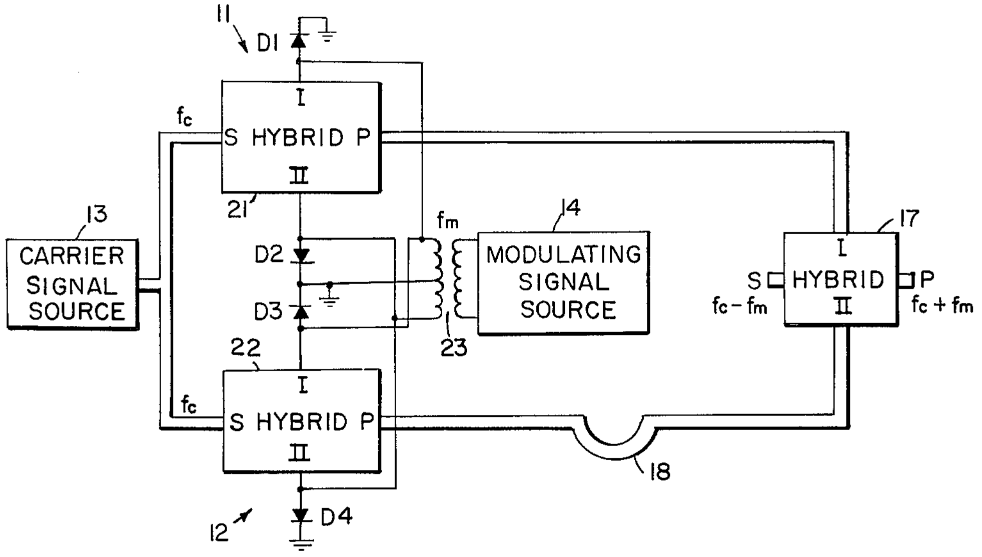

Other features, objects and advantages of the invention will become apparent from the following specification when read in connection with the accompanying drawing in which:

FIG. 1 is a block diagram generally illustrating the logical arrangement of a system according to the invention; and FIG. 2 is a combined block-schematic circuit diagram illustrating a preferred embodiment of the invention.

With reference now to the drawing and more particularly FIG. 1 thereof, there is shown a block diagram of a system according to the invention. Balanced modulators 11 and 12 balance modulate a common carrier signal from carrier signal source 13 of frequency $f_c$ with a common modulating signal from modulating signal source 14 of frequency $f_m$ to provide a pair of balanced modulated signals which are combined in hybrid 17 to provide an upper sideband signal on parallel branch 15 and a lower sideband signal on series branch 16 of hybrid 17. This result is accomplished if the effective electrical pathlength between carrier signal source 13 through balanced modulator 11 to side branch I differs from the effective electrical pathlength between carrier signal source 13 through balanced modulator 12 to side branch II by substantially an odd multiple of quarter wavelengths at the modulating frequency. In FIG. 1 this difference in pathlength is introduced by section 18 of length L. However, it could also be introduced fully or partially in the paths between the carrier signal source and the balanced modulators, or in the balanced modulators themselves.

The mode of operation will be better understood from considering the nature of a hybrid. When the side branches of the hybrid are terminated in equal impedances, energy applied to one of the series or parallel branches does not reach the other. Energy applied to the series branch is delivered to the side branch loads effectively in series while energy applied to the parallel branch reaches the side branches over parallel paths. The electrical pathlength between side branch II and the series branch S differs from that between the side branch II and the parallel branch P by substantially 180 electrical degrees. The electrical pathlength between side branch I and series branch S and that between side branch I and parallel branch P are of substantially equal electrical length. In-phase energy applied to the side branches add at the parallel branch and cancel at the series branch. Oppositely-phased energy applied to the side branches add at the series branch and cancel at the parallel branch. It has been discovered that if the difference in pathlength between the carrier signal source 13 and the side branches of hybrid 17 is made substantially equal to an odd multiple of electrical quarter wavelengths at the modulating frequency, the lower side bands arrive at the side branches in phase opposition while the upper sidebands arrive at the side branches in phase coincidence. This relationship results in the lower sideband being available at series branch 16 while the upper sideband is available at parallel branch 15. Preferably, branches 15 and 16 are terminated in the impedance seen looking into the respective branches.

Referring to FIG. 2, there is shown a preferred embodiment of the invention in which hybrids are used for the balanced modulators and waveguides intercouple the carrier signal source, balanced modulators and the output hybrid. Waveguides of equal electrical length intercouple carrier signal source 13 with respective series branches of hybrids 21 and 22 comprising balanced modulators 11 and 12, respectively. Respective output waveguides couple the parallel branches of hybrids 21 and 22 to side branches I and II of hybrid 17, respectively. The side branches of hybrids 21 and 22 are terminated in similarly poled diodes $D_1$–$D_4$. A transformer 23 couples the modulating signal from source 14 to the different side branches so that when a side branch I diode of hybrids 21 and 22 is rendered conductive, the side branch II diodes are rendered nonconductive and vice versa. It is preferred that the characteristic impedance of the waveguides correspond to the input impedance seen at the respective inputs where connected.

It is also preferred that the signals arriving at side branches I and II of output hybrid 17 are of substantially equal amplitude to maximize the separation of the sidebands. Maximum separation may be achieved by introducing adjustable attenuation in one or both output waveguides. The attenuation may be adjusted in one of the output waveguides until measurement of the undesired spectral component in one of the series and parallel branches indicates that the undesired component amplitude is minimized.

While choosing physical lengths of output waveguides in accordance with the principles of the invention will lead to satisfactory results in many practical situations, best results are obtained by experimentally adjusting the difference in effective electrical pathlengths between output waveguides until measurement of the undesired spectral component in one of the series and parallel branches indicates that the undesired component amplitude is minimized.

It has been discovered that if the difference in effective electrical pathlengths between balanced modulators and respective side branches of the output hybrid corresponds substantially to an odd multiple of a quarter wavelength at the modulating frequency, $f_m$, one of the series and parallel branches of the output hybrid delivers energy of predominantly upper sideband frequency while the other delivers energy of predominantly lower sideband frequency. The pathlength difference is preferably a number of wavelengths at upper sideband frequency, $f_c+f_m$, and that same number of wavelengths less a half wavelength at the lower sideband frequency, $f_c - f_m$. A convenient way for determining this number, designated N, is $$N = \frac{1}{4}(f_c/f_m + 1)$$

where $f_c$ is the carrier frequency and $f_m$ is the modulating frequency. Then the difference in effective electrical pathlength, L, is $$L = \frac{N}{f_c + f_m} = \frac{N - 1/2}{f_c - f_m}$$

Considering an example where $f_c = 300$ mc. and $f_m = 15$ mc., N is 5¼. The upper sideband wavelength is 300/315 meters while the lower sideband wavelength is 300/285 meters. The pathlength difference, L, is 1575/315, or 5 meters. If we multiply the lower sideband wavelength by 4¾, we get 1425/285, which also corresponds to 5 meters. Since the wavelength at 15 mc. is 20 meters, this 5 meters is a quarter wavelength at the modulating frequency.

A feature of the invention is that the only parameter which seems to require stability to provide the desired suppressed carrier single sideband modulation is the frequency of the modulating signal source. Since this frequency is usually low, it is relatively easy to accomplish. Remaining parameters relate primarily to geometry which can be accurately controlled in initial manufacture so that single sideband suppressed carrier modulation is obtained over a relatively wide range of high frequency carriers. If it were desired to vary the frequency of the modulating signal, corresponding variations could be established in the pathlength difference by suitable means. For example, the section 18 might be a lumped parameter delay line including electrically controllable inductances or inductances controlled by a signal supplied by a discriminator, or other suitable means, related to the frequency of the modulating signal.

It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. A modulation system comprising,
 a source of a signal of carrier frequency,
 a source of a signal of modulating frequency,
 first and second balanced modulators coupled to said sources for modulating said carrier frequency signal with said modulating frequency signal to provide first and second balanced modulated signals respectively,
 a hybrid having first and second side branches,
 a series branch and a parallel branch,
 first means for coupling the output of said first balanced modulator to said first side branch,
 means for coupling the output of said second balanced modulator to said second side branch,
 and means for establishing the effective electrical length from said carrier frequency signal source to said first side branch differing from the effective electrical length between said carrier frequency signal source and said second side branch by an odd multiple of quarter wavelengths at said modulating frequency.

2. A modulation system in accordance with claim 1 wherein each of said balanced modulators comprises,
 a hybrid having a series branch,
 a parallel branch and a pair of side branches,
 a unilaterally conducting device for loading each side branch,
 first and second input waveguides coupled from said carrier signal source to one of the series and parallel branches of said balanced modulator hybrids,
 said first and second coupling means respectively comprising first and second output waveguides respectively coupled from the other of said series and parallel branches to said first hybrid side branch and said second hybrid side branch,
 and means for coupling said modulating frequency signal to said unilaterally conducting devices to render said devices in a balanced modulator hybrid alternately conductive during mutually exclusive time intervals.

3. A modulation system comprising,
 combining means having an output branch and first and second input branches,
 said combining means providing on said output branch one of in-phase and phase-opposed signals applied to said input branches while substantially fully rejecting the other,
 modulation means for providing first and second modulated signals each having an upper spectral component separated from a lower spectral component by substantially twice a modulating frequency,
 and means for coupling said first and second modulated signals to said first and second input branches respectively while establishing substantial phase coincidence at said input branches at one of said spectral component frequencies and substantial phase opposition at said input branches at the other of said spectral component frequencies comprising first and second waveguides having an effective electrical pathlength difference corresponding to substantially an odd multiple of quarter wavelengths at said modulating frequency.

4. A modulation system in accordance with claim 3 wherein said combining means comprises hybrid means having a pair of side branches comprising said first and second input branches and at least one of series and parallel branches comprising said output branch.

5. A modulation system in accordance with claim 4 wherein said modulation means comprises first and second balanced modulators,
 a source of a modulating signal of said modulating frequency,
 a source of a carrier signal of carrier frequency substantially midway between said upper and lower spectral components,
 and means for coupling both said sources to both said balanced modulators.

6. A modulation system in accordance with claim 5 wherein said means for coupling comprise first and second waveguides respectively coupling said first balanced modulator to said first input branch and said second balanced modulator to said second input branch.

7. A modulation system in accordance with claim 6 wherein said combining means comprises hybrid means having a pair of side branches comprising said first and second input branches and at least one of series and parallel branches comprising said output branch.

8. A modulation system in accordance with claim 7 wherein said first and second modulated signals arrive at respective ones of said side branches with substantially equal amplitudes.

References Cited by the Examiner

UNITED STATES PATENTS

| | | | |
|---|---|---|---|
| 2,496,521 | 2/1950 | Dicke | 332—45 |
| 2,872,647 | 2/1959 | Smith | 332—45 |
| 3,029,396 | 4/1962 | Sichak | 332—44 X |

ROY LAKE, *Primary Examiner*.